(12) United States Patent
Mizoguchi et al.

(10) Patent No.: US 10,634,903 B2
(45) Date of Patent: Apr. 28, 2020

(54) OPTICAL DEVICE UNIT AND IMAGE DISPLAY APPARATUS

(71) Applicant: SEIKO EPSON CORPORATION, Tokyo (JP)

(72) Inventors: Yasushi Mizoguchi, Suwa (JP); Hisako Kojima, Kai (JP); Shinichi Wakabayashi, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 15/697,766

(22) Filed: Sep. 7, 2017

(65) Prior Publication Data
US 2018/0095269 A1 Apr. 5, 2018

(30) Foreign Application Priority Data
Sep. 30, 2016 (JP) .................................. 2016-192977

(51) Int. Cl.
| | |
|---|---|
| G02B 26/08 | (2006.01) |
| H04N 9/31 | (2006.01) |
| G03B 21/00 | (2006.01) |
| G02B 27/01 | (2006.01) |
| G03B 21/14 | (2006.01) |
| F21V 8/00 | (2006.01) |
| G03B 21/20 | (2006.01) |

(52) U.S. Cl.
CPC ..... G02B 26/0875 (2013.01); G02B 27/0101 (2013.01); G02B 27/0149 (2013.01); G02B 27/0172 (2013.01); G02B 27/0176 (2013.01); *G03B 21/005* (2013.01); *G03B 21/142* (2013.01); *H04N 9/317* (2013.01); *H04N 9/3188* (2013.01); *G02B 6/0055* (2013.01); *G02B 2027/0147* (2013.01); *G02B 2027/0159* (2013.01); *G03B 21/2066* (2013.01)

(58) Field of Classification Search
None
See application file for complete search history.

(56) References Cited

U.S. PATENT DOCUMENTS

| | | | |
|---|---|---|---|
| 2003/0007202 A1* | 1/2003 | Moser | G02B 6/2931 359/15 |
| 2006/0232660 A1 | 10/2006 | Nakajima et al. | |

(Continued)

FOREIGN PATENT DOCUMENTS

| | | |
|---|---|---|
| JP | 2004-037757 A | 2/2004 |
| JP | 2011-203460 A | 10/2011 |

(Continued)

*Primary Examiner* — Jennifer D. Carruth
(74) *Attorney, Agent, or Firm* — Oliff PLC

(57) ABSTRACT

An optical device unit that can operate very quietly and an image display apparatus having the optical device unit are provided. An optical device unit includes an optical device and a coupler joined to the optical device. The optical device includes an optical portion that is shaped as a plate and has a light incident surface on which light is incident, a movable portion that supports the optical portion, pivot portions that support the movable portion, and a support portion that supports the pivot portions. The support portion includes connection portions to which the pivot portions are connected and the connection portions are located away from the coupler.

13 Claims, 11 Drawing Sheets

(56) References Cited

U.S. PATENT DOCUMENTS

| | | | |
|---|---|---|---|
| 2006/0284790 A1* | 12/2006 | Tegreene | G02B 26/101 345/7 |
| 2008/0042052 A1* | 2/2008 | Sprague | G02B 26/085 250/234 |
| 2009/0040464 A1* | 2/2009 | Utagawa | G03B 21/16 353/20 |
| 2011/0234650 A1 | 9/2011 | Watanabe | |
| 2015/0277104 A1 | 10/2015 | Hino | |
| 2016/0004071 A1 | 1/2016 | Mizoguchi | |
| 2016/0091773 A1 | 3/2016 | Mizoguchi et al. | |
| 2016/0124216 A1 | 5/2016 | Kojima et al. | |
| 2016/0124217 A1 | 5/2016 | Kojima et al. | |
| 2016/0227177 A1 | 8/2016 | Mizoguchi | |

FOREIGN PATENT DOCUMENTS

| | | |
|---|---|---|
| JP | 2015-187678 A | 10/2015 |
| JP | 2016-014725 A | 1/2016 |
| JP | 2016-071232 A | 5/2016 |
| JP | 2016-071233 A | 5/2016 |
| JP | 2016-090751 A | 5/2016 |
| JP | 2016-090752 A | 5/2016 |
| JP | 2016-143989 A | 8/2016 |

* cited by examiner

OPTICAL DEVICE UNIT AND IMAGE DISPLAY APPARATUS

BACKGROUND

1. Technical Field

The present invention relates to an optical device unit and an image display apparatus.

2. Related Art

A technology of shifting the optical axis of image light projected by using a light modulator is known. This technology is used to obtain a projected image having a resolution higher than that of a liquid crystal panel. One example of the technology is disclosed in JP-A-2011-203460. In JP-A-2011-203460, a wobbling device including a light transmissive plate and a drive unit for oscillating the light transmissive plate is used as a device for shifting the optical axis of image light.

However, JP-A-2011-203460 does not disclose the structure of the wobbling device in sufficient detail. For example, in a case that the wobbling device is supported by a support body, vibrations of the wobbling device would inevitably be transmitted to the support body, which might result in unusual noise being generated.

SUMMARY

An advantage of some aspects of the invention is that an optical device unit that can operate very quietly and an image display apparatus having the optical device unit are provided.

An optical device unit according to one aspect of the invention includes an optical device and a coupler joined to the optical device. The optical device includes an optical portion that has a plate shape and a light incident surface on which light is incident, a movable portion that supports the optical portion, pivot portions that support the movable portion, and a support portion that supports the pivot portions. The support portion includes connection portions to which the pivot portions are connected and the connection portions are located away from the coupler. With this configuration, vibrations from the optical device are not readily transmitted to the coupler, and as a result, the optical device unit that can operate very quietly is obtained.

It is preferable that in the optical device unit, the optical device be joined to the coupler at portions of the support portion that are distant from the connection portions to which the pivot portions are connected. In this case, vibrations of the optical device are not readily transmitted to the coupler.

In the optical device unit, it is preferable that the support portion have a pair of first extensions disposed to oppose each other with the movable portion therebetween and a pair of second extensions that connect first corresponding ends and second corresponding ends of the pair of the first extensions. It is also preferable that the pivot portions be connected to the corresponding first extensions and that the second extensions be joined to the coupler. In this case, vibrations of the optical device are not readily transmitted to the coupler.

In the optical device unit, it is preferable that the connection portions of the support portion to which the pivot portions are connected be located away from the coupler in a thickness direction of the optical portion. In this case, the support portion can be separated from the coupler while suppressing planar expansion of the optical device unit.

In the optical device unit, it is preferable that the connection portions of the support portion to which the pivot portions are connected be located away from the coupler in an in-plane direction of the optical portion. In this case, the support portion can be separated from the coupler while suppressing an increase in the thickness of the optical device unit.

In the optical device unit, it is preferable that the optical portion be light transmissive. In this case, the optical axis of light can be shifted by using refraction.

An image display apparatus according to another aspect of the invention includes the optical device unit described above, and the optical device unit is formed so as to perform spatial modulation of light and thereby shift a position of a pixel that is displayed by emitting the light. In this case, a reliable image display apparatus that can realize the effects of the optical device unit is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

An optical device unit and an image display apparatus according to the invention will be described in detail in accordance with embodiments illustrated in the accompanied drawings.

First Embodiment

Figure 1:
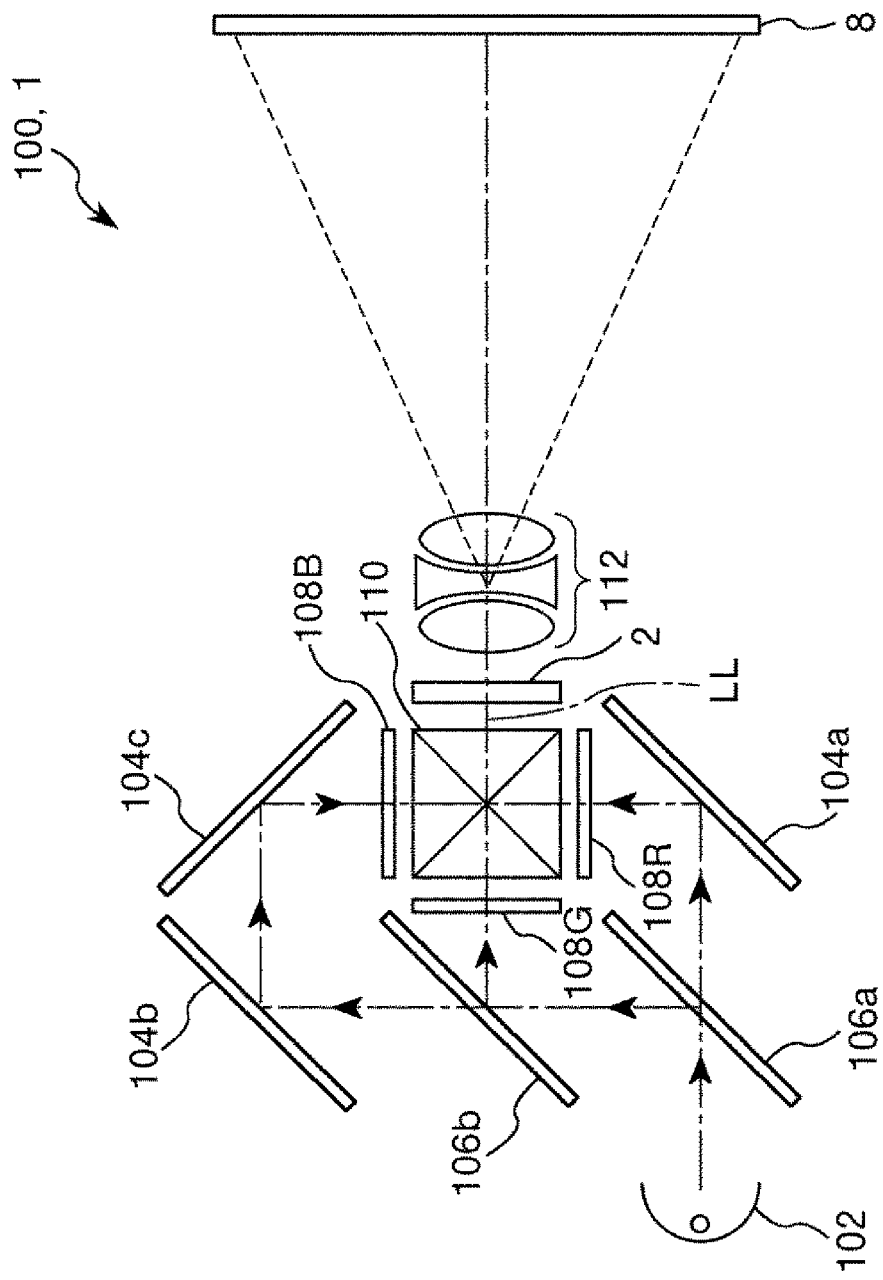
FIG. 1 is a view illustrating an optical configuration of an image display apparatus according to a first embodiment of the invention.
Figure 2:
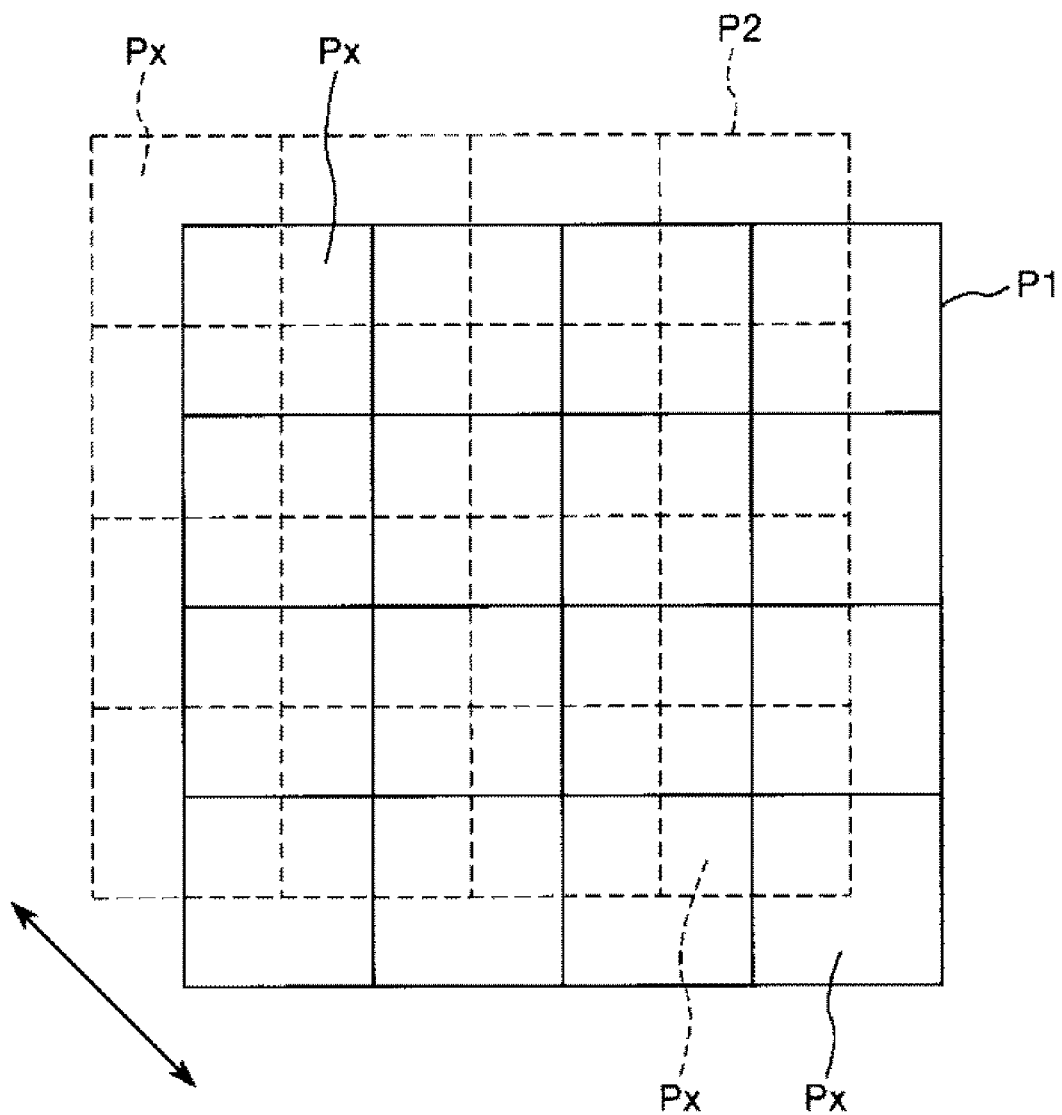
FIG. 2 is a view illustrating a state in which image light is shifted.
Figure 3:
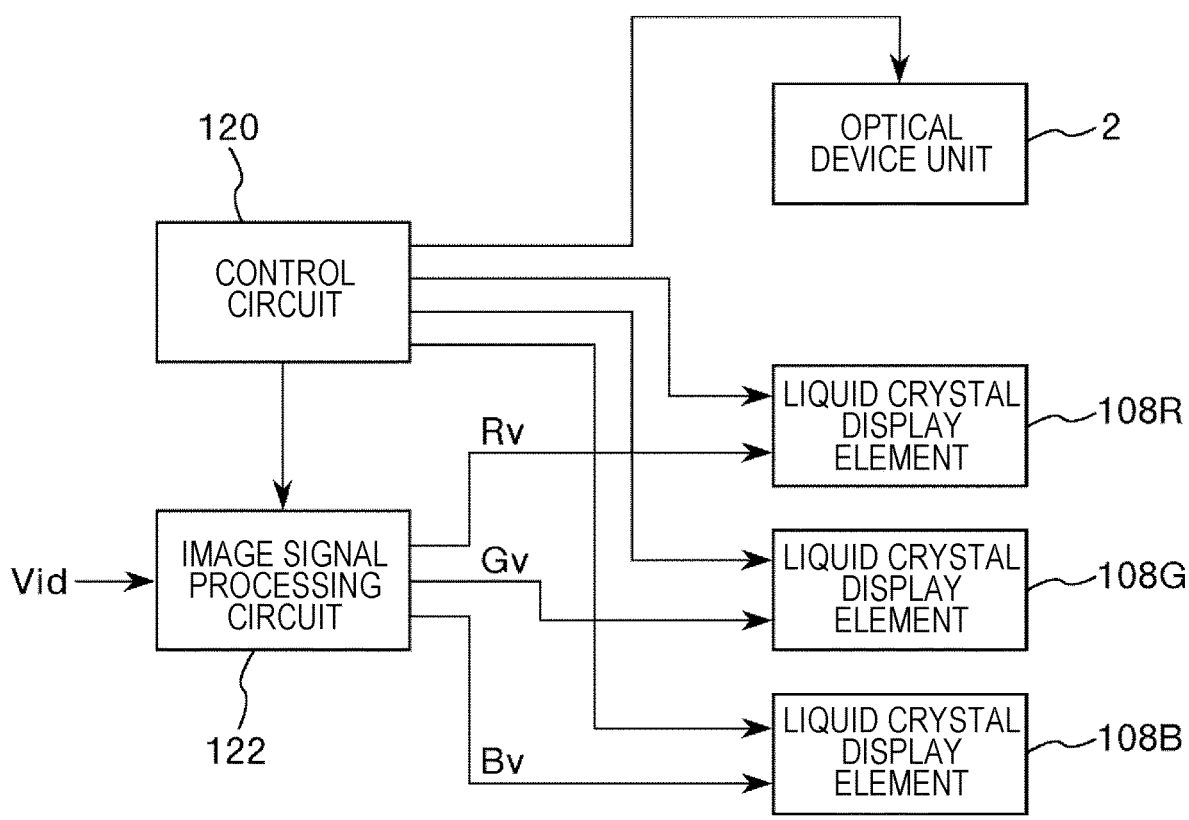
FIG. 3 is a block diagram representing an electrical configuration of the image display apparatus of FIG. 1.
Figure 4:
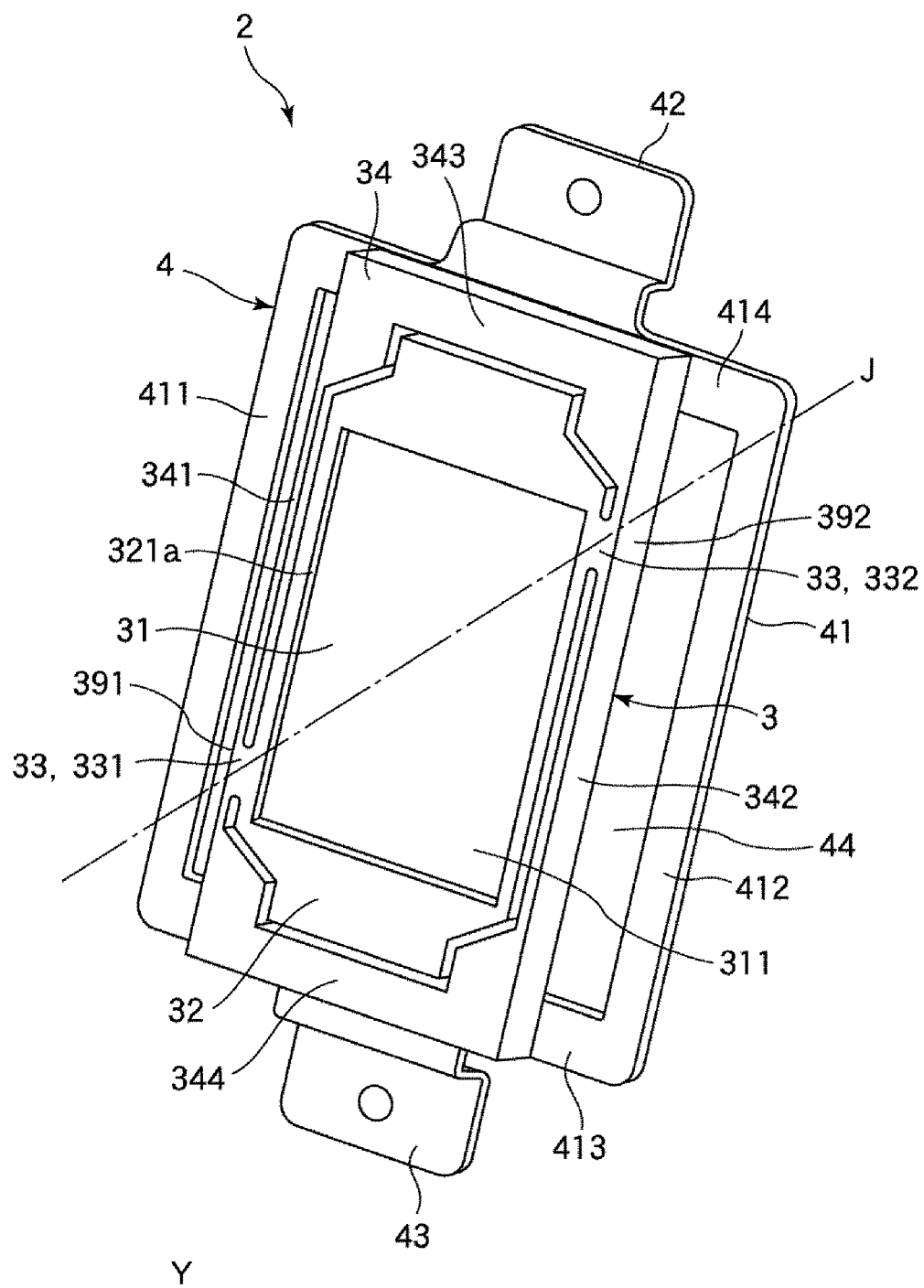
FIG. 4 is a perspective view illustrating an optical device unit included in the image display apparatus of FIG. 1.
Figure 5:
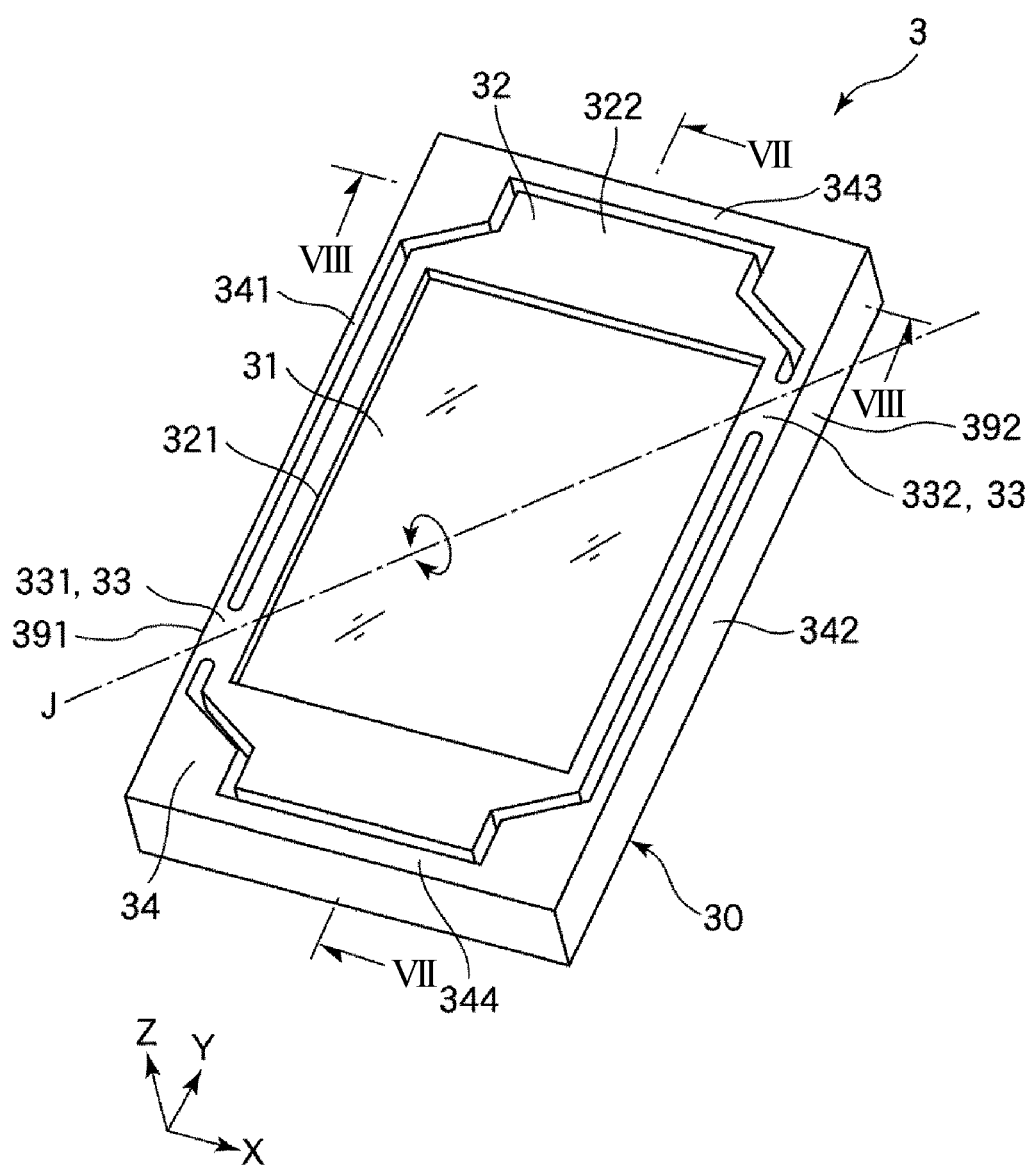
FIG. 5 is a perspective view illustrating an optical device included in the optical device unit of FIG. 4.
Figure 6:
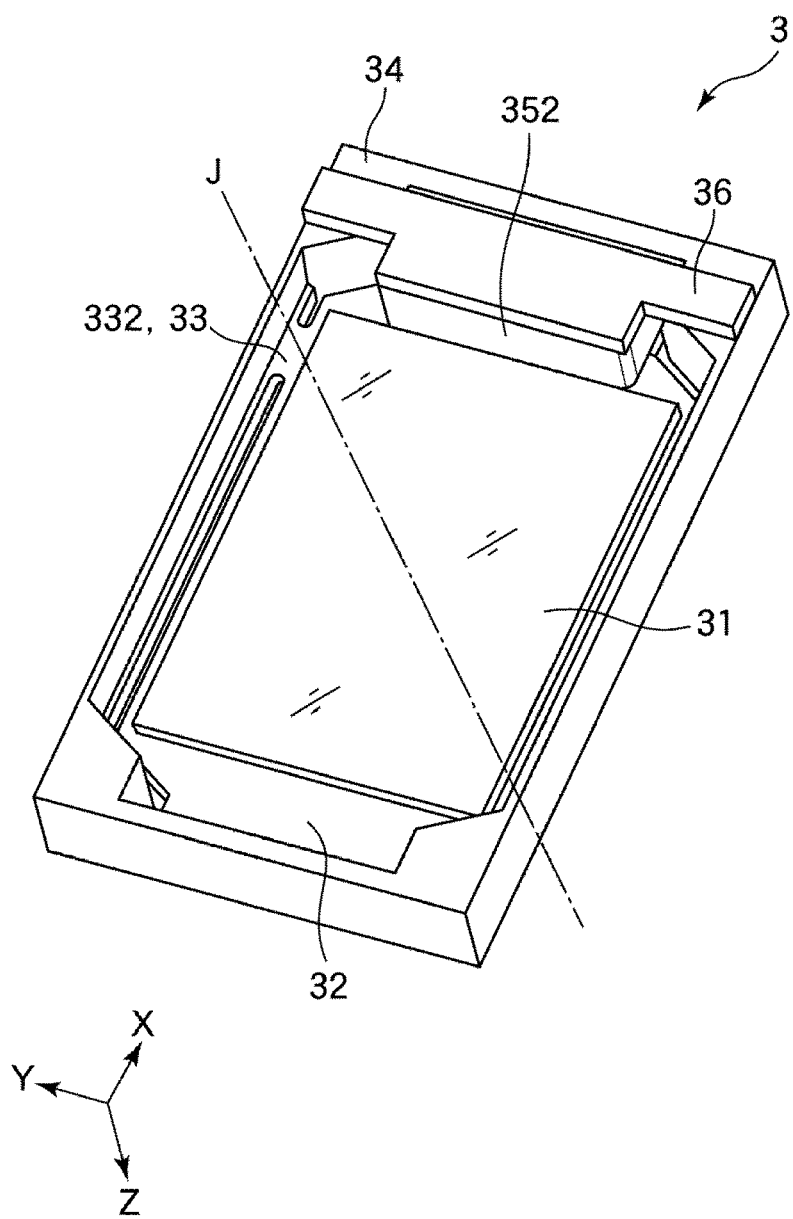
FIG. 6 is a perspective view illustrating an optical device included in the optical device unit of FIG. 4.
Figure 7:
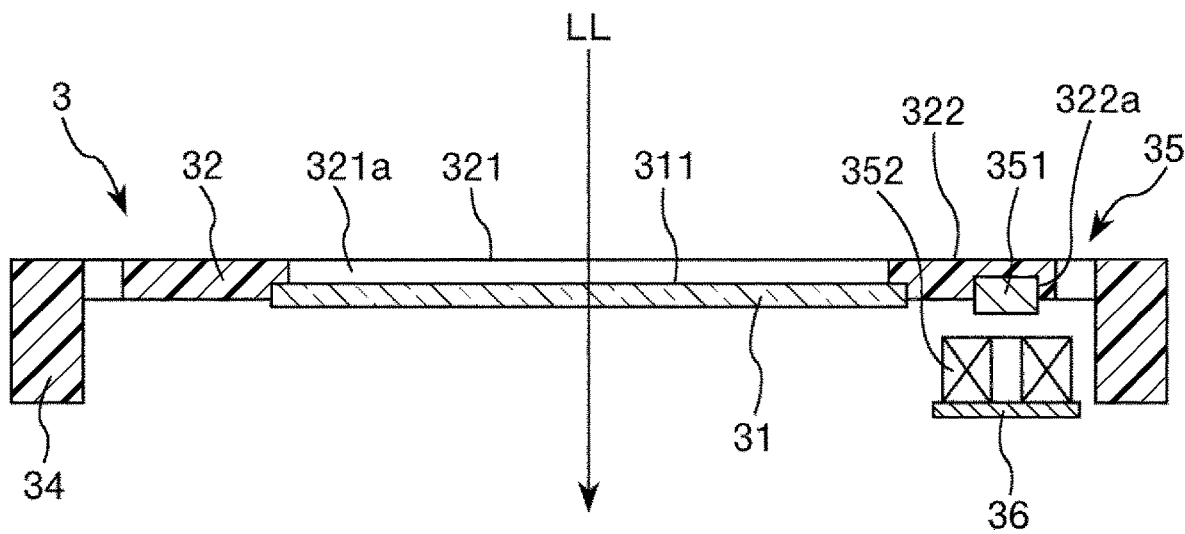
FIG. 7 is a cross-sectional view taken along line VII-VII in FIG. 5.
Figure 7:
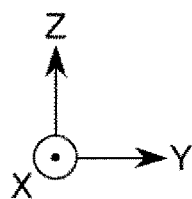
Figure 8:
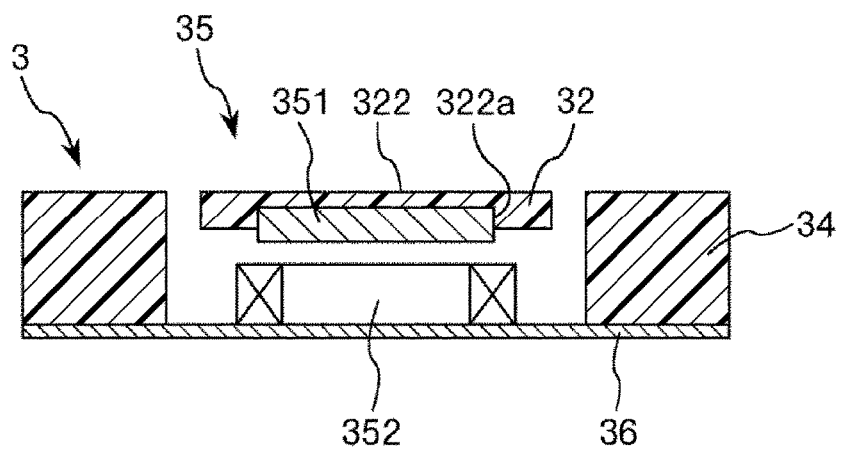
FIG. 8 is a cross-sectional view taken along line VIII-VIII in FIG. 5.
Figure 8:
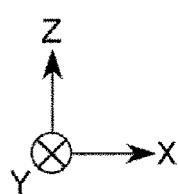
Figure 9:
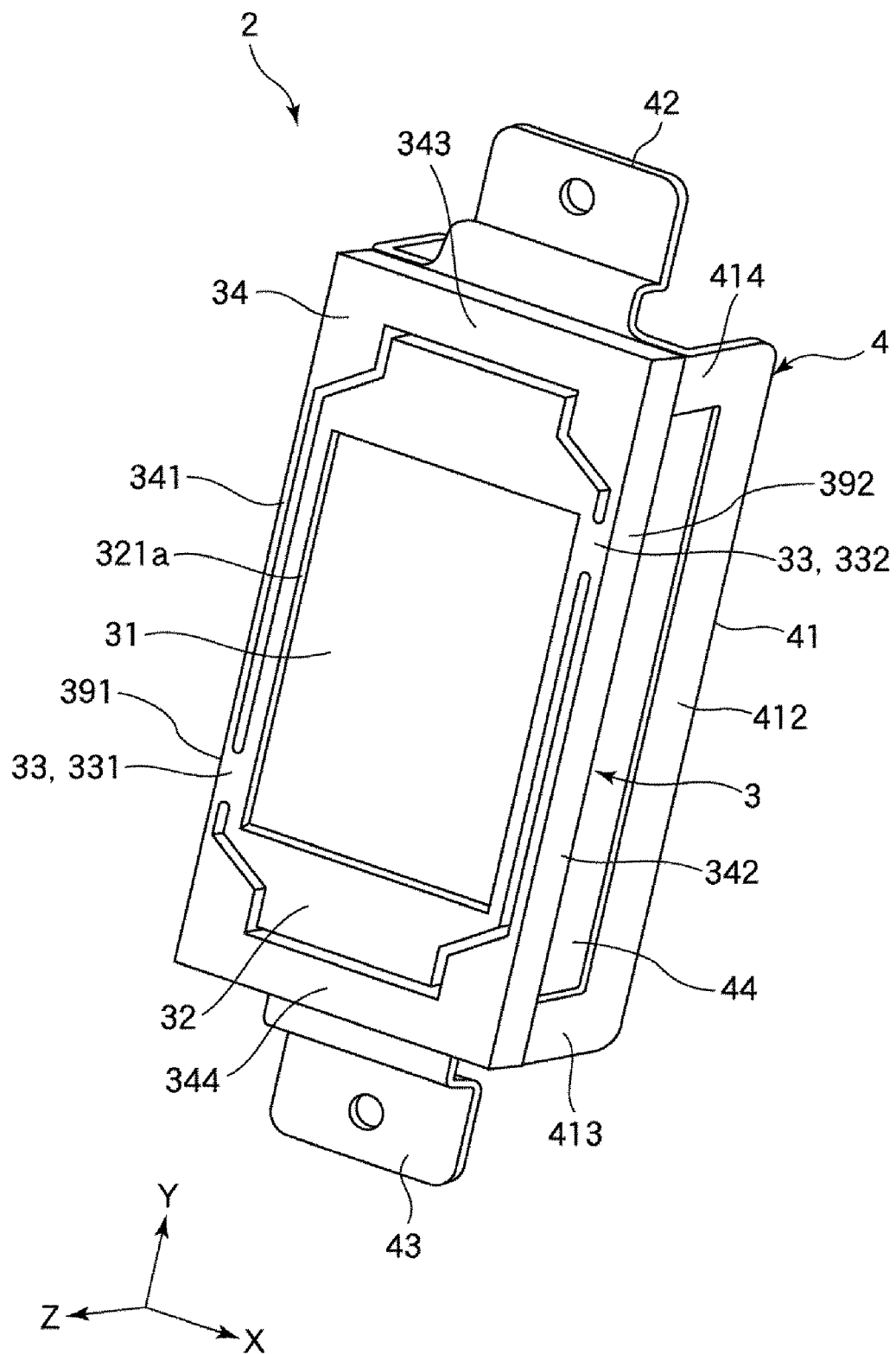
FIG. 9 is a perspective view illustrating a variation of the optical device unit of FIG. 4.
Figure 10:
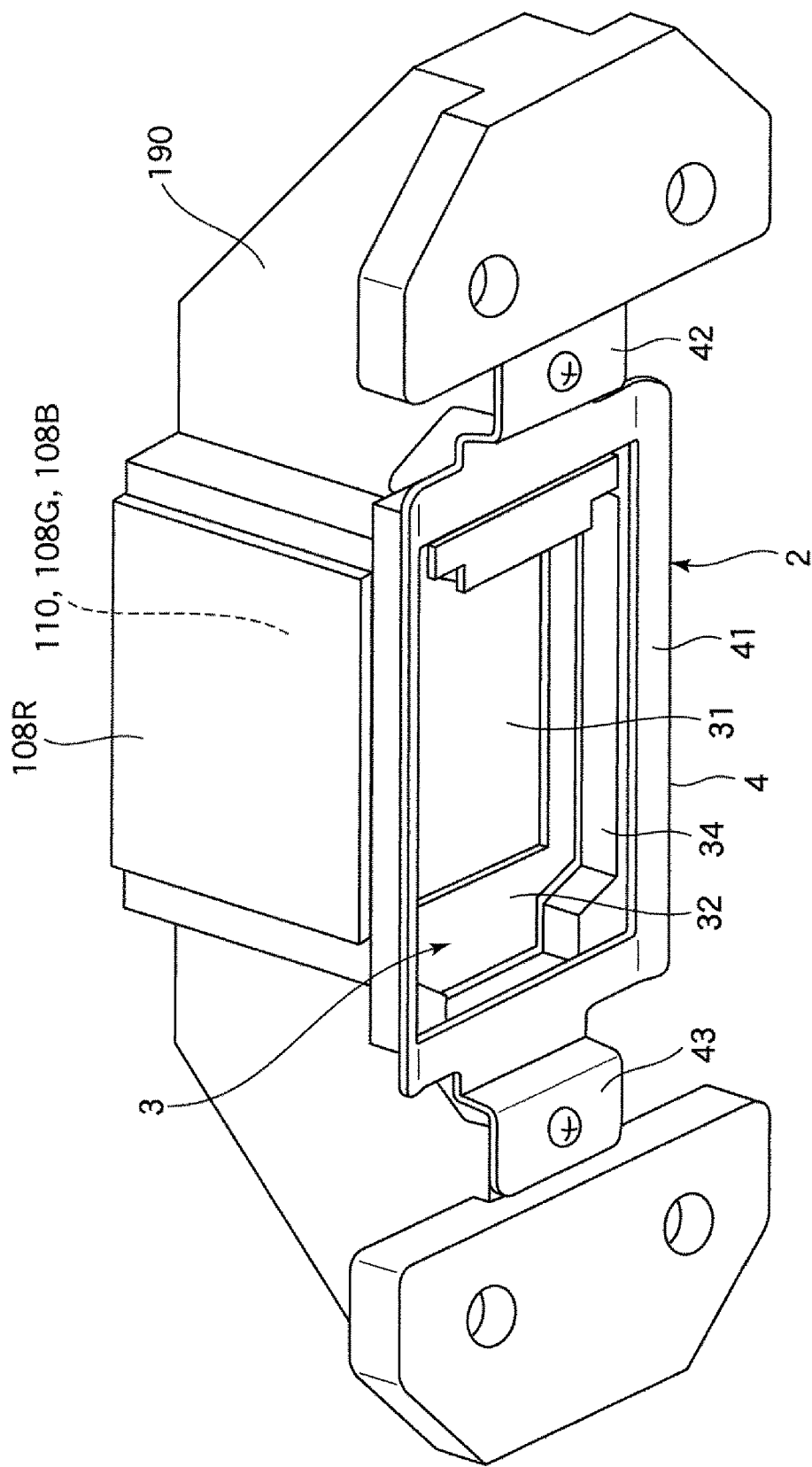
FIG. 10 is a perspective view illustrating a state in which the optical device unit is fixed to a target object.

FIG. 1 is a view illustrating an optical configuration of an image display apparatus according to a first embodiment of the invention. FIG. 2 is a view illustrating a state in which image light is shifted. FIG. 3 is a block diagram representing an electrical configuration of the image display apparatus of FIG. 1. FIG. 4 is a perspective view illustrating an optical device unit included in the image display apparatus of FIG. 1. FIG. 5 and FIG. 6 are perspective views illustrating an optical device included in the optical device unit of FIG. 4. FIG. 7 is a cross-sectional view taken along line VII-VII in FIG. 5. FIG. 8 is a cross-sectional view taken along line VIII-VIII in FIG. 5. FIG. 9 is a perspective view illustrating a variation of the optical device unit of FIG. 4. FIG. 10 is a perspective view illustrating a state in which the optical device unit is fixed to a target object. For convenience of description, X, Y, and Z denote three axes orthogonally intersecting each other and are presented in FIGS. 4 to 9. In the following description, a direction that extends parallel to the X-axis is referred to also as an "X-axis direction", a direction that extends parallel to the Y-axis is referred to as a "Y-axis direction", and a direction that extends parallel to the Z-axis is referred to as a "Z-axis direction".

As illustrated in FIG. 1, an image display apparatus 1 is provided in an LCD projector 100. As illustrated in FIG. 1, the projector 100 includes a light source 102, mirrors 104a, 104b, 104c, dichroic mirrors 106a, 106b, liquid crystal display elements 108R, 108G, 108B, a dichroic prism 110, an optical device unit 2 that serves as an optical path deflector, and a projector lens system 112. The projector 100 is formed so as to display pixels by emitting light beams and shift the position of the pixels by causing the optical device unit 2 to perform spatial modulation on the light beams.

Regarding the light source 102, for example, a halogen lamp, a mercury lamp, or a light emitting diode (LED) may be used. In addition, a type of lamp that emits white light is used as the light source 102. The light emitted by the light source 102 is first separated by a dichroic mirror 106a into red light (R) and light of other colors. The red light, which is reflected by the mirror 104a, enters the liquid crystal display element 108R while the light of other colors is further separated by the dichroic mirror 106b into green light (G) and blue light (B). Subsequently, the green light enters the liquid crystal display element 108G while the blue light enters the liquid crystal display element 108B after being reflected by the mirrors 104b and 104c.

The liquid crystal display elements 108R, 108G, and 108B are transmissive type spatial light modulators that correspond to respective RGB primary colors and function as spatial light modulators. Each of the liquid crystal display elements 108R, 108G, and 108B includes pixels that are arranged in a matrix of, for example, 1080 vertical columns and 1920 horizontal rows. Each pixel regulates the quantity of transmitted light relative to incident light, and each of the liquid crystal display elements 108R, 108G, and 108B coordinately controls the distribution of quantities of light transmitted by all the pixels. The light, which has been spatially modulated by each of the liquid crystal display elements 108R, 108G, and 108B, is combined in the dichroic prism 110 and emitted therefrom as full-color image light LL. The emitted image light LL is enlarged by the projector lens system 112 and projected onto a screen 8.

The projector 100 has the optical device unit 2 disposed between the dichroic prism 110 and the projector lens system 112. The projector 100 is formed so as to be able to project, on the screen 8, images having a resolution higher than that of the liquid crystal display elements 108R, 108G, and 108B (for example, 4K-resolution images on the screen 8 if the liquid crystal display elements 108R, 108G, and 108B are capable of producing full-resolution high-definition images). The projector 100 achieves this by causing the optical device unit 2 to shift the optical axis of the image light LL (i.e., to perform "pixel shifting"). The principle of this will be briefly described with reference to FIG. 2. The optical device unit 2 has a glass plate 31 that can transmit the image light LL. Changing the orientation of the glass plate 31 can shift the optical axis of the image light LL due to refraction.

The projector 100 utilizes optical axis shifting so as to display an image on the screen 8 at an image display position P1 when the optical axis of the image light LL is shifted toward one side or at an image display position P2 when the optical axis of the image light LL is shifted toward another side. The image display positions P1 and P2 are configured such that the image display position P1 is shifted, on the screen 8, diagonally (i.e., in a direction indicated by the arrow in FIG. 2) by half a pixel (i.e., an amount corresponding to half of a pixel Px) from the image display position P2. By displaying the image alternately at the image display position P1 and at the image display position P2, the number of pixels appears to increase, and as a result, the image projected on the screen 8 exhibits a higher resolution. The shift amount between the image display positions P1 and P2 is not limited to half a pixel, but may be, for example, one-quarter of the pixel Px or three-quarters of the pixel Px.

As illustrated in FIG. 3, the projector 100 with this configuration further includes a control circuit 120 and an image signal processing circuit 122, in addition to the optical device unit 2 and the liquid crystal display elements 108R, 108G, and 108B. The control circuit 120 controls various operations including an operation for writing data signals on the liquid crystal display elements 108R, 108G, and 108B, an operation for optical path deflection in the optical device unit 2, and an operation for generating data signals in the image signal processing circuit 122. The image signal processing circuit 122 separates an image signal Vid supplied from an external apparatus (not shown) into three primary colors of RGB and converts them into data signals Rv, Gv, and Bv that are suitable for the operation of the liquid crystal display elements 108R, 108G, and 108B. Thus, the converted data signals Rv, Gv, and Bv are supplied to the corresponding liquid crystal display elements 108R, 108G, and 108B so as to cause the display elements to operate in accordance with the supplied data signals.

As illustrated in FIG. 4, the optical device unit 2 has an optical device 3 and a coupler 4 that is joined to the optical device 3. The optical device 3 includes a glass plate 31 that serves as a plate-like optical portion and has a light incident surface 311 on which the image light LL is incident, a movable portion 32 that supports the glass plate 31, pivot portions 33 that support the movable portion 32 so as to oscillate the movable portion 32 about an oscillation axis J, and a support portion 34 that supports the pivot portions 33. Connection portions 391 and 392 that connect the pivot portions 33 to the support portion 34 are located away from the coupler 4. With this configuration, vibrations from the optical device 3 are not readily transmitted to the coupler 4, and as a result, the optical device unit 2 is able to operate very quietly. More specifically, when the movable portion 32 oscillates about the oscillation axis J, the pivot portions 33 are torsionally deformed. Along with the torsional deformation, the connection portions 391 and 392, including their vicinities, that connect the pivot portions 33 and the support portion 34 (hereinafter simply referred to as "vibrating regions") consequently vibrate. If the vibrating regions of the support portion 34 are in contact with the coupler 4, vibrations of the support portion 34 are transmitted to the coupler 4. Consequently, the coupler 4 vibrates and generates unusual noise or the like. On the other hand, if the vibrating regions of the support portion 34 are located away from the coupler 4 as in the present embodiment, vibrations of the support portion 34 are not readily transmitted to the coupler 4, and thus vibrations of the coupler 4 can be reduced. As a result, generation of unusual noise or the like can be suppressed, and the optical device unit 2 that operates very quietly can be obtained. The optical device unit 2 will be described below in detail.

The coupler 4 is a member that is fixed to a housing or the like of the projector 100 while holding the optical device 3 thereon. The coupler 4 maintains the optical device 3 at a predetermined position. In the present embodiment, as illustrated in FIG. 4, the coupler 4 is configured to have a base portion 41 that supports the optical device 3 and a pair of fixation portions 42 and 43 that are connected to the base portion 41 and that are fixed to the housing or the like. However, the coupler 4 is not limited to this configuration as far as it does not hamper operation of the optical device 3. The base portion 41 is a frame having a quadrangular opening 44 therein. Providing the base portion 41 as a frame can increase the rigidity of the coupler 4 while the coupler 4 can be light weight and support the optical device 3 more stably. This can also prevent the base portion 41 from blocking the image light LL. The base portion 41 has a pair of extensions 411, 412 that extend in the Y-axis direction and a pair of extensions 413, 414 that extend in the X-axis direction. A pair of the extensions 413, 414 connect first corresponding ends and second corresponding ends of a pair of the extensions 411, 412. The fixation portions 42 is connected to the middle of the extension 414, and the fixation portion 43 is connected to the middle of the extension 413.

The material of the coupler 4 is not specifically limited here. However, it is preferable that the material be, for example, a metal, such as iron, nickel, or aluminum, or an alloy containing at least one of these metals (such as stainless steel, inconel, duralumin), or that the material be an intermetallic compound, or that the material be an oxide, nitride, or carbide, etc., of these metals. By using such a material, the coupler 4 can be made rigid so that the optical device 3 can be supported and held at a predetermined position more stably.

As illustrated in FIGS. 5 to 8, the optical device 3 has a structure 30 that includes the movable portion 32 having the glass plate 31 therein, the support portion 34 provided so as to surround the movable portion 32, and the pivot portions 33 that connect the movable portion 32 and the support portion 34 so as to support the movable portion 32 on the support portion 34 and oscillate (or turn) the movable portion 32 about the oscillation axis J. The optical device 3 also has a drive mechanism 35 to oscillate the movable portion 32 with respect to the support portion 34. The optical device 3 with this configuration is disposed inside the projector 100 in such a manner that the +Z side of the optical device 3 in the Z-axis direction is directed toward the dichroic prism 110 and the −Z side of the optical device 3 is directed toward the projector lens system 112. However, the orientation of the optical device 3 is not specifically limited to this, and the optical device 3 may be oriented in a direction other than the direction in the present embodiment.

The movable portion 32, which is shaped as a flat plate, includes a glass plate support 321 that supports the glass plate 31 and a permanent magnet support 322, provided outside of the glass plate support 321, that supports a permanent magnet 351 included in the drive mechanism 35. As illustrated in FIG. 7, the glass plate support 321 has a through hole 321a at the center thereof, and the glass plate 31 is fitted into the through hole 321a. The glass plate 31 is, for example, glued to the glass plate support 321 with an adhesive or the like (not shown).

The glass plate 31, which is also a flat plate, is rectangular when viewed in plan view. The glass plate 31 is light transmissive, which is achieved by one principal surface serving as a light incident surface and the other principal surface serving as a light exiting surface. The glass plate 31 with this configuration can refract the incident image light LL by inclining the glass plate 31 from the position at which the angle of incidence of the image light LL is 0°. In other words, the glass plate 31 can shift the optical axis of the image light LL by using refraction. By changing the orientation of the glass plate 31, the direction and the amount of deflection of the image light LL can be controlled so as to obtain an intended angle of incidence. Note that the size of the glass plate 31 may be appropriately determined so as to be able to transmit the image light LL that emerges from the dichroic prism 110. Also note that it is preferable that the glass plate 31 be substantially colorless and transparent. In addition, an antireflection coating may be formed on the light incident surface and on the light exiting surface of the glass plate 31.

The material of the glass plate 31 is not specifically limited but may include, for example, various glass materials such as no-alkali glass, borosilicate glass, and silica glass. Note that although the glass plate 31 serves as the optical portion in the present embodiment, the optical portion is not limited to the glass plate 31 as far as the optical portion is formed of a material that is light transmissive and able to refract the image light LL. For example, the optical portion may be formed of a crystal, such as rock crystal and sapphire, or of a resin, such as a polycarbonate resin and an acrylic resin. However, as in the present embodiment, the glass plate 31 is preferable because the glass plate 31 can increase the rigidity of the optical portion and thus can reduce deflection unevenness in the image light LL when the image light LL is deflected at the optical portion.

As illustrated in FIG. 7, the permanent magnet support 322 having the permanent magnet 351 is disposed at the rim of the glass plate support 321. The permanent magnet support 322 is disposed at a position deviating from the oscillation axis J. The permanent magnet support 322 has a recess 322a in which the permanent magnet 351 is fitted. The fitted permanent magnet 351 is glued to the recess 322a with an adhesive or the like (not shown).

As illustrated in FIG. 4, the pivot portions 33 have a first pivot portion 331 and a second pivot portion 332, and the movable portion 32 is supported at the both sides thereof by the first pivot portion 331 and the second pivot portion 332. In addition, when viewed in plan view, the first pivot portion 331 and the second pivot portion 332 are located so as to deviate from each other both in the X-axis direction and in the Y-axis direction. The oscillation axis J is thereby formed so as to incline by 45 degrees both from the X-axis and from the Y-axis. Note that in the present embodiment, the first pivot portion 331 and the second pivot portion 332 are arranged, when viewed in plan view, in point symmetry with respect to the center of the glass plate 31. As a result, the balance of the movable portion 32 when it oscillates is improved. The inclination angle of the oscillation axis J with respect to the X-axis (or the Y-axis) is not limited to 45 degrees.

As illustrated in FIG. 4, the support portion 34 is a rectangular frame and has a pair of first extensions 341 and 342 that oppose each other with the movable portion 32 therebetween and a pair of second extensions 343 and 344 that connect first corresponding ends and second corresponding ends of a pair of the first extensions 341 and 342. The pivot portions 33 are connected to the first extensions 341 and 342, and the second extensions 343 and 344 are joined to the coupler 4.

More specifically, the first extensions 341 and 342 both extend in the Y-axis direction. The first pivot portion 331 is connected to one end side of the first extension 341 (the −Y side in the Y-axis direction). The second pivot portion 332 is connected to one end side of the first extension 342 (the +Y side in the Y-axis direction). In contrast with the first extensions 341 and 342, the second extensions 343 and 344 both extend in the X-axis direction. The second extension 343 connects first corresponding ends of the first extensions 341 and 342 while the second extension 344 connects second corresponding ends of the first extensions 341 and 342.

As illustrated in FIG. 4, the length of the support portion 34 (i.e., the length in the Y-axis direction) is almost equal to the length of the base portion 41 (i.e., the length in the Y-axis direction), while the width of the support portion 34 (i.e., the length in the X-axis direction) is smaller than the width of the opening 44 of the base portion 41 (i.e., the length in the X-axis direction). As a result, the first extensions 341 and 342 can be located inside the opening 44 when viewed in plan view, which reliably creates a non-contact condition between the first extensions 341, 342 and the coupler 4. In the support portion 34 with this configuration, substantially all regions (including the connection portions 391, 392) of the first extensions 341 and 342, to which the pivot portions 33 are connected, are separated from the extension 411 or 412 while the support portion 34 is joined to the extensions 413, 414 of the coupler 4 at the second extensions 343, 344. Thus, the optical device 3 is joined to the coupler 4 at positions in the support portion 34 that are distant from the connection portions 391 and 392 to which the pivot portions 33 are connected. As described above, when the movable portion 32 oscillates about the oscillation axis J, the pivot portions 33 are torsionally deformed accordingly. Along with the torsional deformation, the connection portions 391 and 392, including their vicinities, that connect the pivot portions 33 and the support portion 34 (i.e., vibrating regions) consequently vibrate. If the vibrating regions of the support portion 34 are in contact with the coupler 4, vibrations of the support portion 34 are transmitted to the coupler 4. Consequently, the coupler 4 vibrates and generates unusual noise or the like. On the other hand, if the vibrating regions of the support portion 34 are located away from the coupler 4 as in the present embodiment, vibrations of the support portion 34 are not readily transmitted to the coupler 4, and thus vibrations of the coupler 4 can be reduced. As a result, generation of unusual noise or the like can be suppressed, and the optical device unit 2 that operates very quietly can be obtained. Moreover, the support portion 34 can be joined to the coupler 4 at the second extensions 343 and 344. In other words, the support portion 34 can be joined to the coupler 4 at positions as distant as practically possible from the vibrating regions. Thus, vibrations of the optical device 3 are not readily transmitted to the coupler 4. Note that the method for joining the support portion 34 to the coupler 4 is not limited to a specific method but may be, for example, adhesive bonding, screw fixation, or male-female coupling.

In the present embodiment, the connection portions 391 and 392 in the support portion 34 to which the pivot portions 33 are connected (i.e., the first extensions 341, 342) are separated from the coupler 4 (the extensions 411, 412) in an in-plane direction of the glass plate 31 (i.e., in-plane direction on the X-Y plane). Thus, the connection portions 391 and 392 in the support portion 34 to which the pivot portions 33 are connected (i.e., the first extensions 341, 342) can be separated from the coupler 4 while suppressing an increase in the thickness of the optical device unit 2.

Note that as illustrated in FIG. 9, the connection portions 391 and 392 of the support portion 34 to which the pivot portions 33 are connected (i.e., the first extensions 341, 342) may be separated from the coupler 4 in the thickness direction of the glass plate 31 (in the Z-axis direction) as a variation of the present embodiment. Thus, in contrast with the present embodiment, the connection portions 391 and 392 of the support portion 34 to which the pivot portions 33 are connected (i.e., the first extensions 341, 342) can be separated from the coupler 4 while suppressing planar expansion of the optical device unit 2.

The structure 30 with this configuration (including the movable portion 32, the pivot portions 33, and the support portion 34) are formed into an integral unit. This can improve the impact resistance and the long-term durability of the connecting portions between the support portion 34 and the pivot portions 33 and the connecting portions between the pivot portions 33 and the movable portion 32.

In addition, the structure 30 is formed of a material that has a smaller Young's modulus than the glass plate 31. It is preferable that the material contain a resin. More preferably, the material contains a resin as a main ingredient. This can effectively suppress the likelihood that the stress generated by the oscillation of the movable portion 32 causes unnecessary vibration of the glass plate 31 itself. In addition, the sides of the glass plate 31 are enclosed by the movable portion 32 made of a soft material. Consequently, when the orientation of the glass plate 31 is shifted, the stress generated in the glass plate 31 can be suppressed to a small amount. Unnecessary vibrations generated in the glass plate 31 due to stress distribution can also be suppressed to a small amount. This leads to prevention of the image light deflected by the glass plate 31 from deviating in an unintentional direction. Moreover, the change in the trajectory of the oscillation of the movable portion 32 in relation to ambient temperature can be reduced. In addition, for example, the pivot portions 33 and their vicinities can be made soft enough, which can provide a small optical device 3 having a low resonance frequency (for example, in an approximate range of 60 to 120 kHz). Furthermore, although the oscillation of the movable portion 32 deforms the first extensions 341 and 342, the structure 30 formed of a resin-containing material can absorb vibrational energy so that the vibrations are not readily transmitted to the coupler 4.

The resin described above is not limited to a specific resin but may encompass, for example, polyolefin such as polyethylene and polypropylene, polyvinyl chloride, polyvinylidene chloride, polystyrene, polyamide, polyimide, polyamide-imide, polycarbonate, acrylic resins, polymethyl methacrylate, acrylonitrile-butadiene-styrene copolymer (ABS resin), acrylonitrile-styrene copolymer (AS resin), butadiene-styrene copolymer, polyoxymethylene, polyvinyl alcohol (PVA), polyester such as polyethylene terephthalate (PET) and polycyclohexane terephthalate (PCT), polyether, polyether ketone (PEK), polyether ether ketone (PEEK), epoxy resin, phenolic resin, urea resin, melamine resin, unsaturated polyester, silicone resin, and polyurethane. The resin may also include copolymers, blends and polymer alloys that contain the above resins as main ingredients. The resin may be formed of one of them or by combining two or more of them.

Next, the drive mechanism 35 that oscillates the movable portion 32 will be described. As illustrated in FIG. 7 and FIG. 8, the drive mechanism 35 is an electromagnetic actuator that has the permanent magnet 351 disposed in the permanent magnet support 322 and a coil 352 that is disposed opposing the permanent magnet 351 so as to generate a magnetic field that acts on the permanent magnet 351. By employing the electromagnetic actuator, the drive mechanism 35 can generate forces sufficient to oscillate the movable portion 32 and oscillate it smoothly with a simple structure.

The permanent magnet 351 extends in the X-axis direction and is magnetized in the Z-axis direction. The permanent magnet 351 is not limited to a specific type of magnet but may be, for example, a neodymium magnet, a ferrite magnet, a samarium cobalt magnet, or an Alnico magnet.

The coil 352 is disposed opposing the permanent magnet 351. The coil 352 is supported by a coil support 36, and the coil support 36 is fixed to the support portion 34. Note that the method of fixing the coil 352 to the coil support 36 is not limited to a specific method, but may be adhesive bonding. In addition, the method of fixing the coil support 36 to the support portion 34 is not limited to a specific method, but may be adhesive bonding, screw fixation, or male-female coupling. The material of forming the coil support 36 is not specifically limited here, but a material similar to that for the structure 30 may be used.

The coil 352 extends in the X-axis direction so as to match the shape of the permanent magnet 351. The coil 352 is an air-core coil. By forming the coil 352 as the air-core coil, the movable portion 32 can be oscillated smoothly. More specifically, if the coil 352 has a magnetic core therein, for example, the permanent magnet 351 may stick to the magnetic core depending on the strength of the magnetism to be generated, which may cause the oscillation axis J to be displaced and may fail to oscillate the movable portion 32 smoothly. In order to prevent such malfunction, it is preferable to use the air-core coil for the coil 352 as in the present embodiment.

In the drive mechanism 35 configured as above, a voltage application unit (not shown) applies a drive signal (AC voltage) to the coil 352, which causes the coil 352 to generate a magnetic field that acts on the permanent magnet 351 so as to oscillate the movable portion 32 with respect to the support portion 34 about the oscillation axis J. Oscillation of the movable portion 32 shifts the optical axis of the image light LL so that the image is displayed alternately at the image display positions P1 and P2. Thereby, the number of pixels appears to increase and the image to be displayed exhibits a higher resolution. The movable portion 32 may oscillate in resonance or in non-resonance.

Note that the drive mechanism 35 is not limited to a specific configuration as far as the drive mechanism 35 can oscillate the movable portion 32 about the oscillation axis J. For example, the drive mechanism 35 (the permanent magnet 351 and the coil 352) is provided only on one side with respect to the oscillation axis J in the present embodiment. However, the drive mechanism 35 may be provided on both sides with respect to the oscillation axis J. Such a configuration leads to more balanced oscillation of the movable portion 32. In contrast with the present embodiment, the coil 352 may be provided in the movable portion 32.

The projector 100 (image display apparatus 1) has been described so far. The projector 100 (image display apparatus 1) includes the optical device unit 2. Thus, the projector 100 (image display apparatus 1) can realize the above-described effects of the optical device unit 2, which makes the projector 100 (image display apparatus 1) more reliable.

Finally, a state in which the optical device unit 2 is fixed in the projector 100 will be described. As illustrated in FIG. 10, the projector 100 has a housing 190 that holds the dichroic prism 110 and the liquid crystal display elements 108R, 108G, and 108B. The optical device unit 2 is joined (or fixed) to the housing 190 with the fixation portions 42 and 43 of the coupler 4. Joining the optical device unit 2 to the housing 190 in this way facilitates positioning of the optical device unit 2 with respect to the dichroic prism 110. Note that the method for joining the fixation portions 42 and 43 to the housing 190 is not specifically limited although screw fixation is used for this purpose in the present embodiment.

In the configuration illustrated in FIG. 10, the housing 190 and the coupler 4 are provided as separate members. However, the housing 190 and the coupler 4, for example, may be formed into an integral unit. In other words, the coupler 4 may serve as the housing 190.

Second Embodiment

Figure 11:
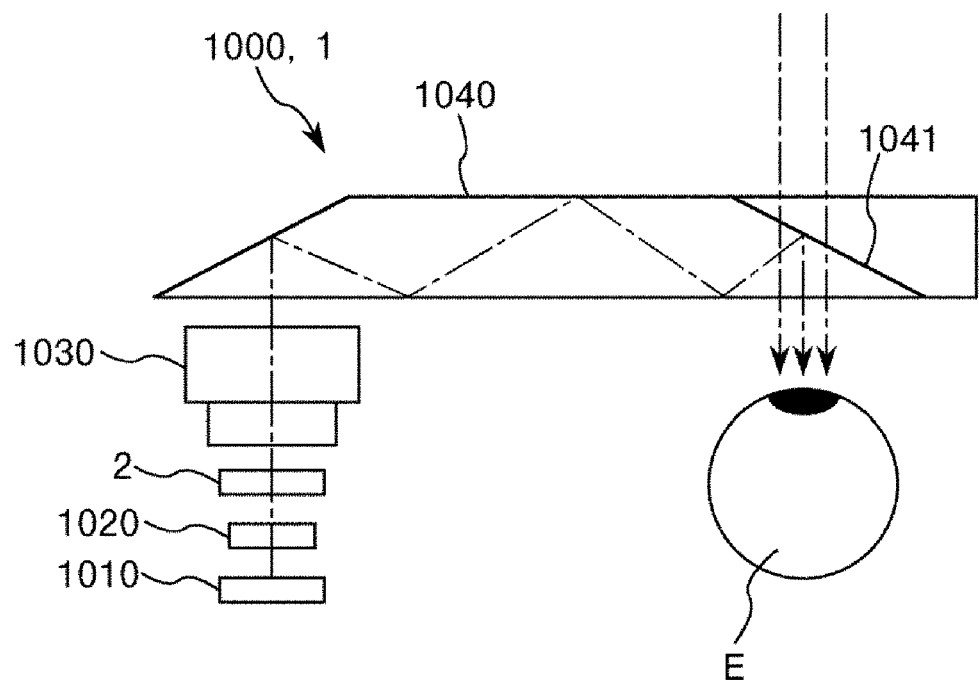
FIG. 11 is a view illustrating an optical configuration of an image display apparatus according to a second embodiment of the invention.

Next, an image display apparatus according to a second embodiment of the invention will be described. FIG. 11 is a view illustrating an optical configuration of the image display apparatus according to the second embodiment of the invention.

In the description of the image display apparatus according to the second embodiment of the invention, only differences from the above-described embodiment are mainly described so that duplicated explanation is omitted.

The image display apparatus 1 according to the present embodiment is provided in a head mount display 1000 of semi-transmissive type (see-through type). The head mount display 1000 is typically worn by an observer (or user) when used. As illustrated in FIG. 11, the head mount display 1000 includes a frame (not shown) that is mounted on a head, a light source 1010 disposed in the frame, a liquid crystal display element 1020, a projector lens system 1030, a light guide portion 1040, and an optical device unit 2. The light source 1010 generates light, which is guided to the liquid crystal display element 1020. The liquid crystal display element 1020 modulates the light into image light. The image light is enlarged by the projector lens system 1030 and enters the light guide portion 1040. The light guide portion 1040 is a plate and has a half-silvered mirror 1041 disposed downstream in the light transmitting direction. The image light in the light guide portion 1040 is reflected repeatedly and subsequently guided to an observer's eye E via the half-silvered mirror 1041. At the same time, light from the outside is guided through the half-silvered mirror 1041 and enters the observer's eye E. Accordingly, the image light is recognized such that the image light is overlaid on a scenery view in the head mount display 1000. In the head mount display 1000 with this configuration, the optical device unit 2 is disposed between the liquid crystal display element 1020 and the projector lens system 1030. The optical device unit 2 is configured to shift the optical axis of the image light LL.

The second embodiment can also realize the effects similar to those described in the first embodiment.

Third Embodiment

Figure 12:
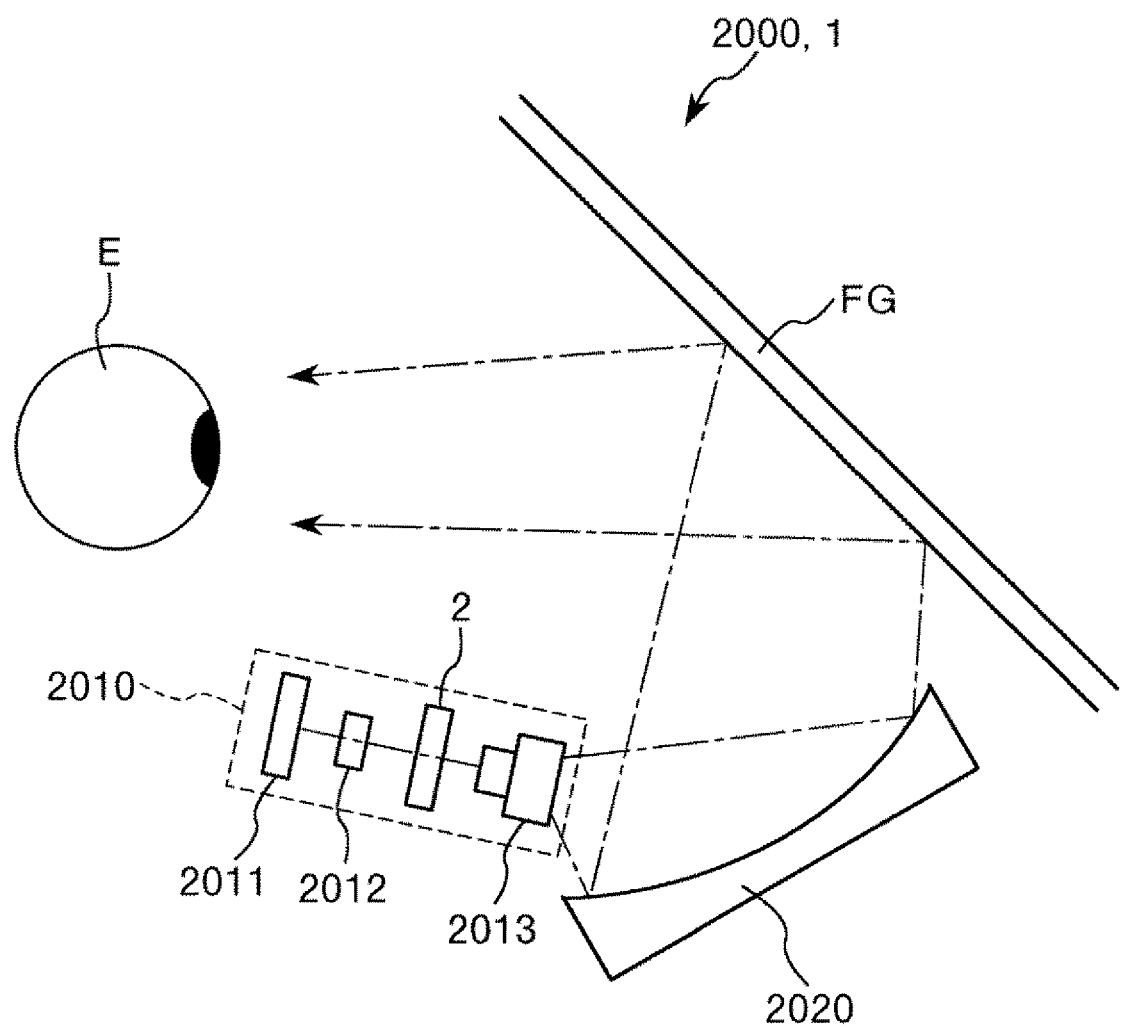
FIG. 12 is a view illustrating an optical configuration of an image display apparatus according to a third embodiment of the invention.

Next, an image display apparatus according to a third embodiment of the invention will be described. FIG. 12 is a view illustrating an optical configuration of the image display apparatus according to the third embodiment of the invention.

In the description of the image display apparatus according to the third embodiment of the invention, only differences from the above-described embodiment are mainly described so that duplicated explanation is omitted.

The image display apparatus 1 according to the present embodiment is provided in a head up display 2000. The head up display 2000 is installed, for example, in an automobile and is used to display for a drier various information (images), such as speed, time, and mileage, on a windshield FG. As illustrated in FIG. 12, the head up display 2000 has a projector unit 2010 including a light source 2011, a liquid crystal display element 2012, and a projector lens system 2013. In addition, the head up display 2000 has a reflection mirror 2020 and the optical device unit 2. The reflection mirror 2020 is a concave mirror that reflects the light projected by the projector unit 2010 so as to project (i.e., display) the light on the windshield FG. In the head up display 2000 with this configuration, the optical device unit 2 is disposed between the liquid crystal display element 2012 and the projector lens system 2013. The optical device unit 2 is configured to shift the optical axis of the light to be projected.

The third embodiment can also realize the effects similar to those described in the first embodiment.

The optical device unit and the image display apparatus according to the invention have been described in accordance with embodiments illustrated in accompanied drawings. However, the invention is not limited to these. For example, in the optical device unit and the image display apparatus according to the invention, the configuration of each portion or unit can be replaced with any configuration having a similar function or can be supplemented by any other configurations.

In the above-described embodiments, the optical device unit has been described as having the optical portion that is light transmissive and is used as a pixel-shifting device. However, the optical device unit is not limited to this particular application. For example, the light incident surface of the optical portion may have light reflecting properties, and the optical device unit may be applied as an optical scanner that performs scanning with the light reflected by the light incident surface by oscillating the movable portion.

Moreover, the cases in which the image display apparatus is provided in the LCD projector, the head mount display, or the head up display have been described in the embodiments. However, apparatuses to which the image display apparatus is applied are not limited to these.

The entire disclosure of Japanese Patent Application No. 2016-192977, filed Sep. 30, 2016 is expressly incorporated by reference herein

What is claimed is:

1. An optical device unit, comprising:
an optical device;
a coupler joined to the optical device; and
an actuator, wherein
the optical device includes an optical portion that has a plate shape and a light incident surface on which light is incident, a movable portion that supports the optical portion, pivot portions that support the movable portion, and a support portion that supports the pivot portions,
the plate shape of the optical portion defines a plane,
the actuator oscillates the movable portion,
the support portion includes connection portions to which the pivot portions are connected and the connection portions are located away from the coupler, and
the connection portions of the support portion to which the pivot portions are connected are located away from the coupler in an in-plane direction of the optical portion, the in-plane direction being a direction that is parallel with the plane defined by the plate shape of the optical portion.

2. The optical device unit according to claim 1, wherein the optical device is joined to the coupler at portions of the support portion that are distant from the connection portions to which the pivot portions are connected.

3. An image display apparatus comprising an optical device unit according to claim 2, wherein the optical device unit is formed so as to perform spatial modulation of light and thereby shift a position of a pixel that is displayed by emitting the light.

4. The optical device unit according to claim 1, wherein
the support portion has a pair of first extensions disposed so as to oppose each other with the movable portion therebetween and a pair of second extensions that connect first corresponding ends and second corresponding ends of the pair of the first extensions, and
the pivot portions are connected to the corresponding first extensions, and the second extensions are joined to the coupler.

5. An image display apparatus comprising an optical device unit according to claim 4, wherein the optical device unit is formed so as to perform spatial modulation of light and thereby shift a position of a pixel that is displayed by emitting the light.

6. The optical device unit according to claim 1, wherein the optical portion is light transmissive.

7. An image display apparatus comprising an optical device unit according to claim 6, wherein the optical device unit is formed so as to perform spatial modulation of light and thereby shift a position of a pixel that is displayed by emitting the light.

8. An image display apparatus comprising an optical device unit according to claim 1, wherein the optical device unit is formed so as to perform spatial modulation of light and thereby shift a position of a pixel that is displayed by emitting the light.

9. The optical device unit according to claim 1, wherein
the plate shape of the optical portion defines a first plane,
the coupler is formed of a frame that defines a second plane, the second plane being parallel with the first plane, and the in-plane direction is parallel with both the first plane and the second plane.

10. An optical device unit, comprising:
an optical device;
a coupler joined to the optical device; and
an actuator, wherein
the optical device includes an optical portion that has a plate shape and a light incident surface on which light is incident, a movable portion that supports the optical portion, pivot portions that support the movable portion, and a support portion that supports the pivot portions,
the actuator oscillates the movable portion,
the support portion includes connection portions to which the pivot portions are connected and the connection portions are located away from the coupler, and
the movable portion is connected to the support by only two pivot portions.

11. The optical device unit according to claim 10, wherein the connection portions of the support portion to which the pivot portions are connected are located away from the coupler in a thickness direction of the optical portion.

12. An image display apparatus comprising an optical device unit according to claim 11, wherein the optical device unit is formed so as to perform spatial modulation of light and thereby shift a position of a pixel that is displayed by emitting the light.

13. An image display apparatus comprising an optical device unit according to claim 10, wherein the optical device unit is formed so as to perform spatial modulation of light and thereby shift a position of a pixel that is displayed by emitting the light.

* * * * *